(12) United States Patent
Williamson

(10) Patent No.: US 8,103,272 B2
(45) Date of Patent: Jan. 24, 2012

(54) TECHNIQUES FOR DATABASE UPDATES

(75) Inventor: Richard John Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 828 days.

(21) Appl. No.: 11/620,701

(22) Filed: Jan. 7, 2007

(65) Prior Publication Data

US 2008/0167025 A1  Jul. 10, 2008

(51) Int. Cl.
*H04W 4/00* (2009.01)
(52) U.S. Cl. .................. 455/433; 455/412.1; 455/502
(58) Field of Classification Search ............. 455/433, 455/414.1–414.4, 425, 41.2, 556.1, 556.2, 455/418; 370/370
See application file for complete search history.

(56) References Cited

U.S. PATENT DOCUMENTS

| | | | | |
|---|---|---|---|---|
| 6,029,196 A | * | 2/2000 | Lenz | 709/221 |
| 2002/0015042 A1 | * | 2/2002 | Robotham et al. | 345/581 |
| 2004/0024795 A1 | * | 2/2004 | Hind et al. | 707/204 |
| 2004/0196787 A1 | * | 10/2004 | Wang et al. | 370/229 |
| 2007/0061245 A1 | * | 3/2007 | Ramer et al. | 705/37 |
| 2007/0191057 A1 | * | 8/2007 | Kamada | 455/558 |
| 2008/0104269 A1 | * | 5/2008 | Vitanov et al. | 709/236 |

* cited by examiner

*Primary Examiner* — Jean Gelin
*Assistant Examiner* — Michael Nguyen
(74) *Attorney, Agent, or Firm* — Blakely, Sokoloff, Taylor & Zafman LLP

(57) ABSTRACT

Techniques for updating databases stored on mobile devices.

15 Claims, 6 Drawing Sheets

TECHNIQUES FOR DATABASE UPDATES

TECHNICAL FIELD

Embodiments of the invention relate to techniques to update databases stored in mobile devices. More particularly, embodiments of the invention relate to techniques to update databases that are intermittently connected to networks/devices that may provide updates to the databases.

BACKGROUND

As processing power and memory have become more affordable and more compact, mobile devices have been designed to include greater functionality. Mobile devices such as cellular-enabled computing devices (e.g., smartphones) include functionality in addition to communications functionality. In general, increased functionality is associated with increased data requirements.

These increased data requirements may come in the form of increased data stored locally on the mobile device and/or increased bandwidth requirements for data transmission purposes. In order to maintain up to date data on the mobile device network bandwidth resources are typically required to provide data to the mobile device. However, network bandwidth resources are limited and increased network bandwidth usage typically results in a higher cost to the user. Therefore, efficient utilization of network resources is desirable.

SUMMARY

In one embodiment, a system is provided that includes a mobile device having a memory to store a name database with an associated version for use by an application running on the mobile device. The system further includes a database server device to store the current name database having an associated version. A host device is configured to communicate with the mobile device to update the name database by utilizing a remote current database on the database server. The host device is configured to communicate with the mobile device via both wired and wireless communications operations and the host device is further configured to determine whether the name database stored on the mobile device should be updated by comparing the version associated with the name database and the version associated with the current name database. In one embodiment, the host device communicates updates to the name database, if any, via the wired communications operations if available and via the wireless communications operations during periods of inactivity if the wired communications operations are not available.

In one embodiment, a host device may include functionality to determine whether a primary wireless connection exits to allow communication with a mobile device having a database with an associated version. The host device may periodically determine the version associated with the database with a host device. The host device may also determine automatically, in response to detecting a secondary connection between the host device and mobile device, the version associated with the database. The version associated with the database on the mobile device is compared with a version of a most recent database available from a remote device in response to determining the version associated with the database on the mobile device. The database on the mobile device is updated if the version associated with the database on the mobile device is not the version of the database available from the remote device.

In one embodiment, a mobile device may receive a query from a host device to request a version identifier corresponding to a database on a mobile device. The mobile device may respond to the query with the version identifier and a location identifier corresponding to a source of a most recent database to which the version of the database stored on the mobile device is compared. An update to the database stored on the mobile device if the version identifier indicates that the database stored on the mobile device does not match the most recent database.

In one embodiment, the name database includes stock names. In one embodiment, the name database includes a listing of geographical locations.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
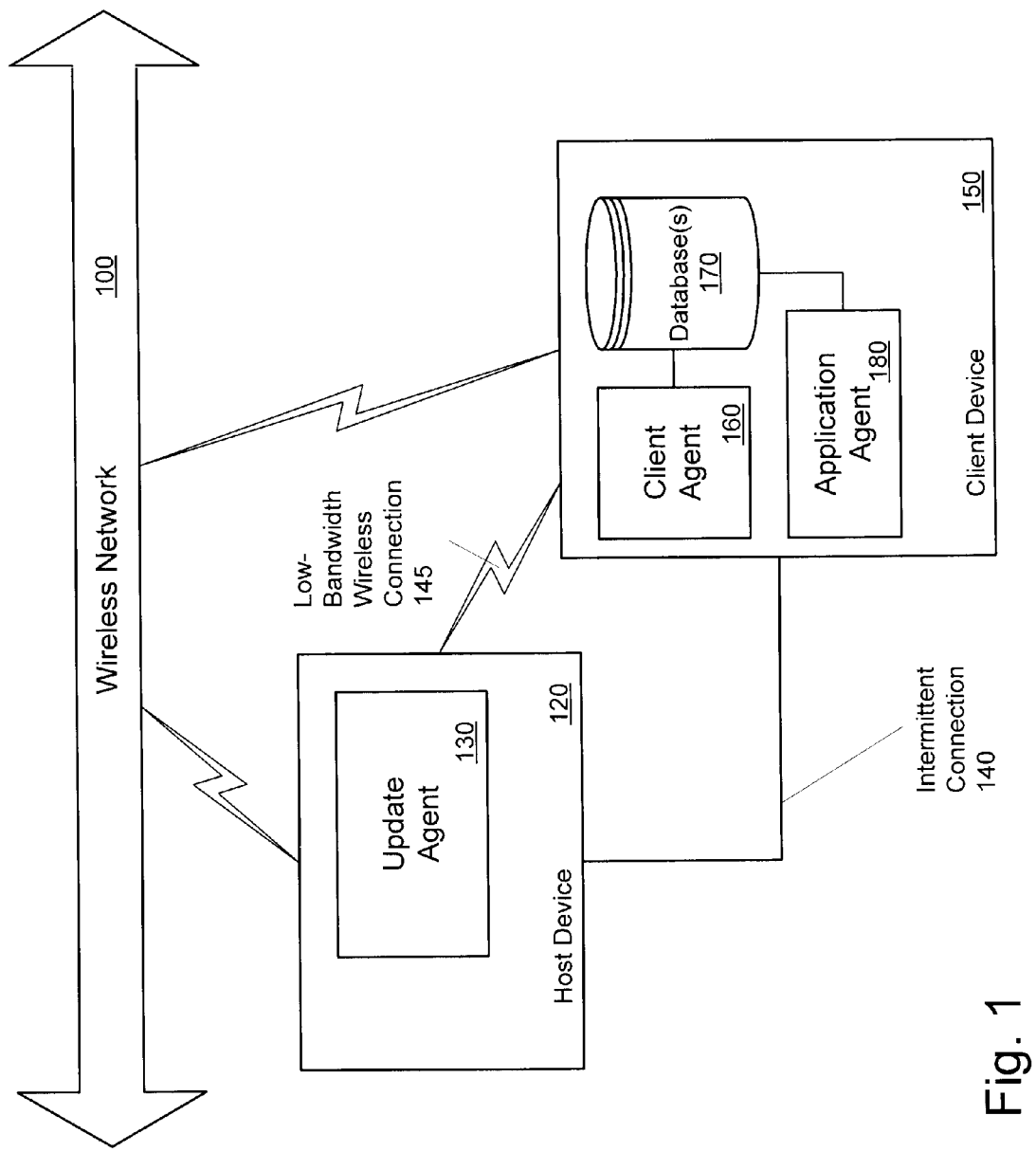
FIG. 1 is a block diagram of an architecture that may support one or more mobile devices having databases that may be updated from remote servers.

FIG. 1 is a block diagram of an architecture that may support one or more mobile devices having databases that may be updated from remote servers. While the example of FIG. 1 includes only a single host device and a single mobile device, any number of host devices and any number of mobile devices may be supported utilizing the techniques described herein. Many of the examples provided herein are in terms of updating databases on a mobile device. However, the device on which the database resides is not required to be mobile. That is, the update techniques described herein are applicable to all devices having databases that may be updated. The physical movement of the device is not required to utilize the techniques described herein.

Wireless network 100 may be any type of wireless network that allows electronic devices to communicate with each other. In one embodiment, wireless network 100 may provide access to a local area network, for example, by conforming to IEEE 802.11b and/or IEEE 802.11g standards, and/or wireless network 100 may conform to other wireless communications standards known in the art, for example, Time Division, Multiple Access (TDMA) protocols, Global System for Mobile Communications (GSM) protocols, Code Division, Multiple Access (CDMA) protocols, and/or any other type of wireless communications protocol.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents.

Client device 150 may be any type of mobile device configured to communicate utilizing the protocols corresponding to wireless network 100. Client device 150 may be, for example, a personal digital assistant (PDA), a cellular device (e.g., smartphone, messaging device, cellular telephone), etc. Client device 150 may be intermittently coupled with host device 120 via any type of wired connection, for example, via a Universal Serial Bus (USB) connection.

Client device 150 may include client agent 160 and database(s) 170. Client agent 160 may provide information to a user of client device 150 via any input/output components of client device 150. Client agent 160 may, for example, provide stock quotes or other financial information to the user or client agent 160 may provide geographical information such as maps to the user. Other types of information may also be provided by client agent 160. Client device 150 may have any number of client agents and/or any number of databases.

Database(s) 170 may include information that is utilized by client agent 160 to present information to the user. The information stored by database(s) 170 may be periodically updated using information available from a remote server (not illustrated in FIG. 1). In the financial information example, database(s) 170 may include stock names, ticker symbols and/or other types of information. In the geographical location example, database(s) 170 may include place names (e.g., city names, street names, river names, points of interest).

Application agent 180 on client device 150 may utilize database(s) 170 to provide useful information to a user of client device 150. For example, application agent 180 may provide stock information to a user or allow a user to request or otherwise access financial information. Application agent 180 may be a mapping or navigational application that may allow a user of client device 150 to navigate a geographical area. Names and/or other information stored in database(s) 170 may be utilized by application agent 180 to provide information to the user. May other examples may also be supported. Any number of applications and/or databases may be supported by client device 150. Application agent may implemented as hardware, software, firmware or any combination thereof.

Host device 120 may be any type of electronic device configured to communicate with client device 150. Host device may be, for example, a desktop computer system or a laptop computer system. Intermittent connection 140 may be any type of wired connection between host device 120 and client device 150. In one embodiment, client device 150 may communicate with other electronic devices including host device 120 via wireless network 100. Client device 150 may also communicate with host device 120 via intermittent connection 140, when available. In one embodiment, client device 150 may selectively utilize the wireless or the wired connection, if available, to update database(s) 170.

In an alternate embodiment, low-bandwidth wireless connection 145 may be utilized to update the contents of database(s) 170. Low-bandwidth wireless connection 145 may be, for example, a Bluetooth connection or any other type of wireless connection. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported. Low-bandwidth wireless connection 145 is referred to as low-bandwidth as compared to wireless network 100 and not because of any specific bandwidth restrictions.

In one embodiment, client agent 160 includes one or more components that correspond to database(s) 170. For example, client agent 160 may include a stock component and/or a weather component that may store names or other information in one or more of database(s) 170. The components of client agent 160 may register with update agent 130 to indicate to update agent 130 that one or more of database(s) 170 should be updated.

In one embodiment, database(s) are updated during periods when no network traffic passes to/from host device 120. Update agent 130 may detect an idle network connection and either initiate an update procedure or indicate the idle network condition to client agent 160, which may initiate an update procedure. By waiting for the idle network condition, network resources may be more efficiently utilized than if updates are initiated during periods of heavy network usage.

In one embodiment, database updates are automatically initiated when client device 150 is coupled to host device 120 through intermittent connection 140 or low-bandwidth wireless connection 145. Intermittent connection 140 and/or low-bandwidth wireless connection 145 may be utilized to synchronize client device 150 with host device 120. This may be performed In response to user initiation and results in the transfer of data between host device 120 and client device 150. The synchronization may update many other components and/or agents than those illustrated in FIG. 1.

Returning to the name database example above, in response to the idle network condition the update of the stock and/or weather database may be initiated. Other types of databases may be updated in a similar manner. As discussed in greater detail below, during the database update process, client agent 160 may provide to update agent 130 a version corresponding to the databases to be updated as well as one or more identifiers (e.g., URLs) that indicate to update agent 130 a network location of version information and/or the most recent version of the database to be updated.

If the database update is initiated in response to the idle network condition, client agent 160 may cause the database version and one or more identifiers to be transmitted to update agent 130 over wireless network 100. If the database update is initiated in response to synchronization over intermittent connection 140 or low-bandwidth wireless connection 145, client agent 160 may cause the database version and one or more identifiers to be transmitted to update agent 130 over intermittent connection 140 or low-bandwidth wireless connection 145.

The techniques described herein may be applied to the architecture of FIG. 1 to allow update agent 130 and client agent 160 to interact to update database(s) 170 with data retrieved from a remote server utilizing one or more of the available connections between host device 120 and client device 150. Update agent 130 and client agent 160 may be implemented as software, hardware, firmware or any combination thereof. Both host device 120 and client device 150 include additional components not illustrated in FIG. 1 for reasons of simplicity of description.

Figure 2:
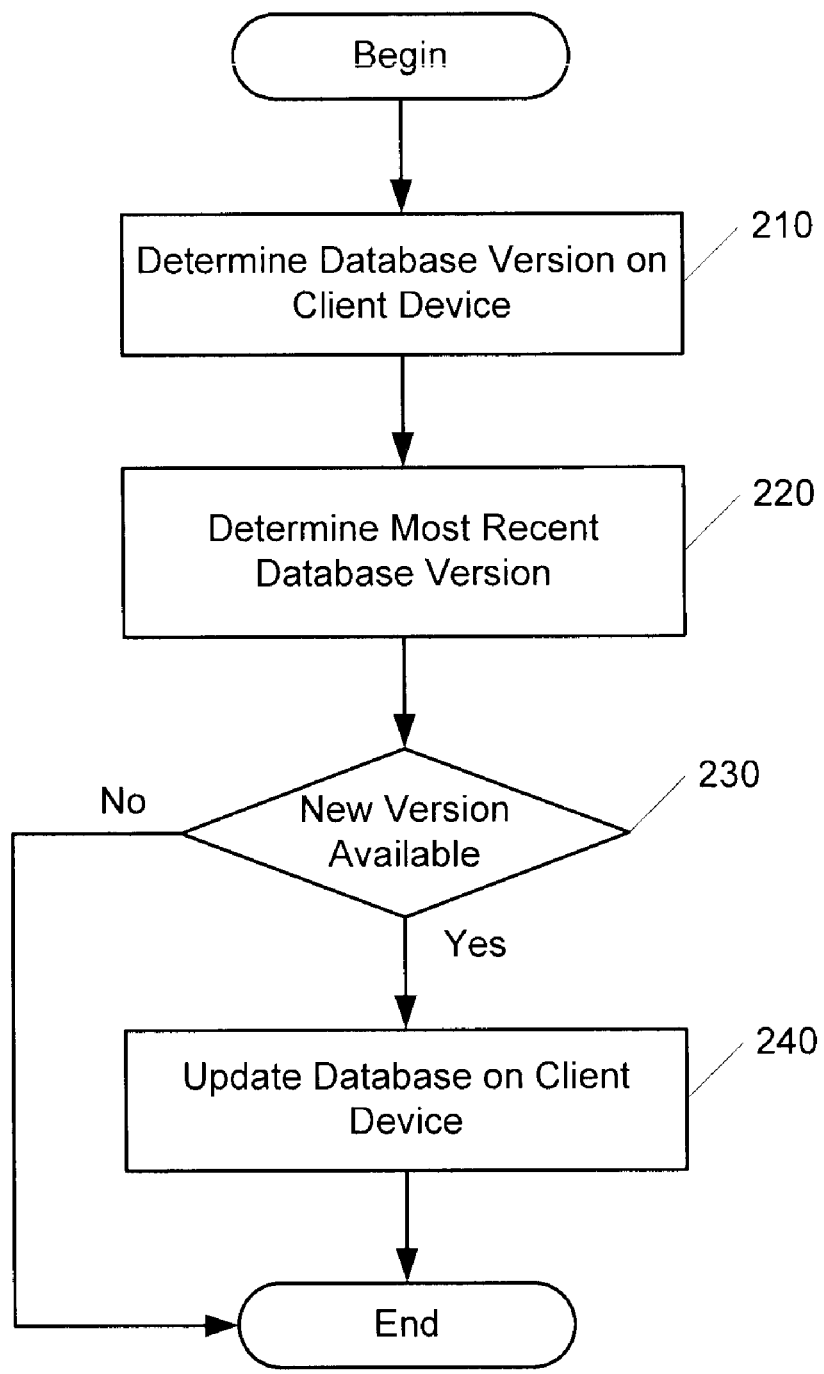
FIG. 2 is a flow diagram of one embodiment of a technique to update a database on a client device.

FIG. 2 is a flow diagram of one embodiment of a technique to update a database on a client device. In one embodiment, the technique of FIG. 2 is accomplished by the host device and the mobile device as described in FIG. 1. The update process may be initiated by the host device or by the mobile device.

The current version of the database stored on the client device may be determined, 210. In one embodiment, the mobile device may determine the version of the database utilizing any technique known in the art. The version may be for a number and/or a date associated with the database. The version may be provided to the host device. In another embodiment, the host device may query the client device or a component of the client device to determine the current version of the database.

The version of the most recent database may also be determined, 220. In one embodiment, the client device may provide the host device with the version of the database on the client as well as an address or locator of the most recent version of the database or other information that may allow the host device to determine the most recent version of the database. In an alternate embodiment, the client device may utilize the address or locator to determine the most recent version of the database through the host device.

If a newer version of the database is not available, 230, the database on the client device is not updated. The host device or the client device may determine whether a more recent version of the database is available by comparing the version (e.g., version number) of the database on the client device with the version (e.g., version number) of a database available from a remote server. If the versions are the same no update is required.

If a newer version of the database is available, 230, the database on the client device is updated, 240. The database on the client device may be updated by, for example, the host device downloading the most recent version of the database over a network and then providing the most recent version of the database to the client device. As another example, the host device may download changes to the database and provide the changes to the client device so that the client device may update the database. The host device may download changes to the database and upload the database from the client device, make the necessary changes and then provide the most current version of the database to the client device.

Multiple databases stored on the client device may be updated in this manner. Various ordering strategies may be employed when updating multiple databases. Also different updating technique may be applied to different databases on the same client device.

Figure 3:
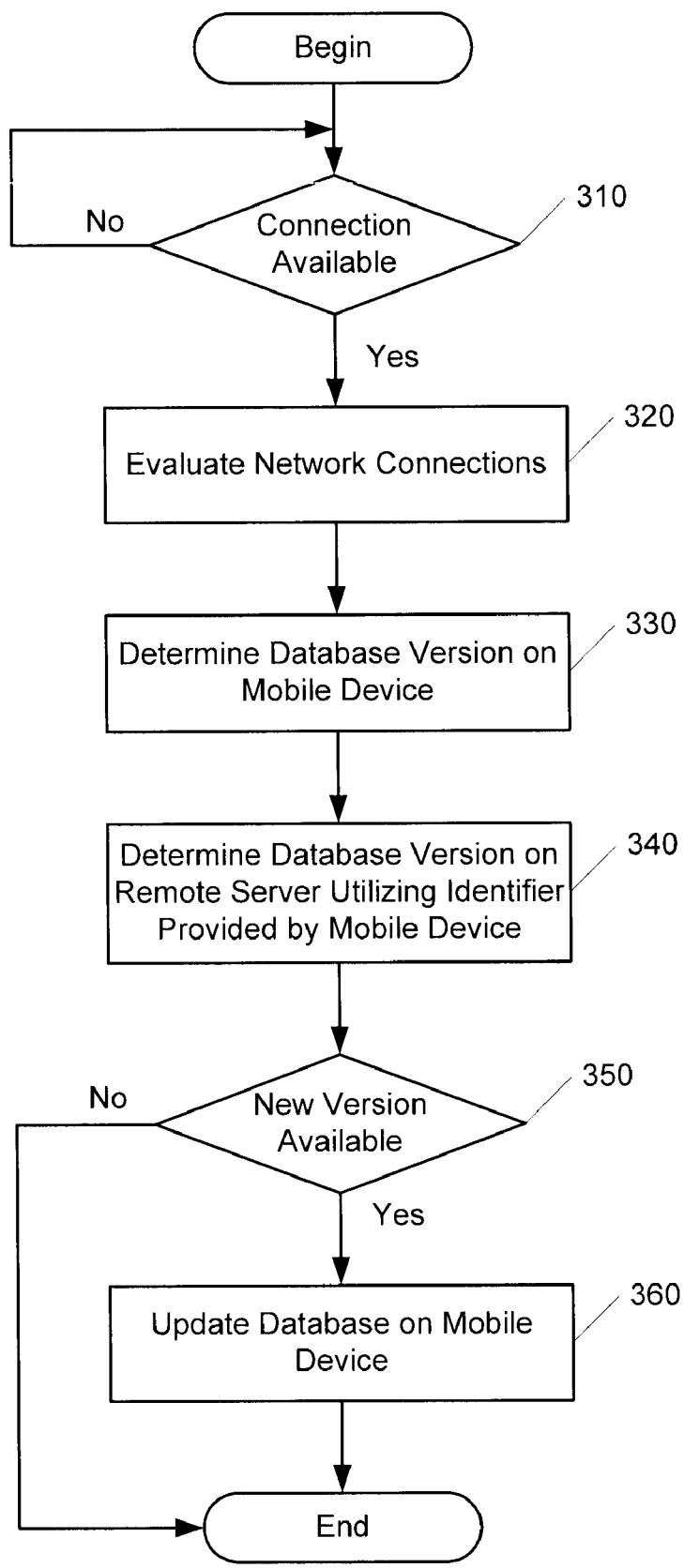
FIG. 3 is a flow diagram of one embodiment of a technique to update a database on a mobile device.

FIG. 3 is a flow diagram of one embodiment of a technique to update a database on a mobile device. In one embodiment the technique of FIG. 3 is performed by the update agent residing on the host device. In alternate embodiments, the technique of FIG. 3 may be performed by multiple devices and/or agents.

In one embodiment, the technique of FIG. 3 is performed automatically in response to the mobile device being physically connected to (i.e., docked with) the host device. The operation of docking the mobile device may also cause other update and/or synchronization operation to occur concurrently. Docking may also be accomplished utilizing a wireless connection. In one embodiment, the mobile device may periodically (e.g., hourly, daily, weekly, monthly) check for updates via a wireless connection and, if a wired connection is available, check for updates in response to the wired connection being available.

The update agent may determine whether a connection is available, 310, to allow the host device to communicate with the mobile device. The available connections may include one or more of a wired connection (e.g., a USB cable physically connecting the host device and the mobile device), a low-bandwidth wireless connection (e.g., Bluetooth), a higher-bandwidth wireless connection (e.g., Wi-Fi), or any combination thereof.

In one embodiment, the wired connection between the host device and the mobile device is provided by a USB connection using any type of cable consistent with the USB specifications. Other connection types may also be supported. Standard Internet Protocol (IP) operations may be performed over the wired connection to provide database updates as described in FIG. 3.

The update agent may evaluate the available connections, 320. If more that one connection is available, the update agent may select a connection to use to update the database. In one embodiment, the low-bandwidth wireless connection and the wired connection are given priority over the higher-bandwidth wireless connection so as to conserve bandwidth on the higher-bandwidth connection. Other priority orderings may also be supported.

In one embodiment, if the higher-bandwidth connection is to be utilized to update the database the higher-bandwidth connection is only used when it would otherwise be idle. That is, the update agent may be given a low priority with respect to other agents and/or applications that may utilize the higher-bandwidth connection. By giving the update agent a relatively low priority updating of the database should not interfere with bandwidth usage by other agents and/or applications. Various techniques for utilizing idle network bandwidth are described in co-pending U.S. patent application Ser. No. 11/620,613, entitled "BACKGROUND TASK EXECUTION OVER A NETWORK," by Jeremy Wyld, Nitin Ganatra and Richard J. Williamson, filed Jan. 5, 2007, which is incorporated herein by reference.

When a connection to be used has been determined, the update agent may determine the version of the database stored on the mobile device, 330. In one embodiment, the update agent may query the client agent on the mobile device to determine the version of the database stored on the mobile device. When the client agent responds to the query, the update agent may be provided with the version of the database stored on the mobile device as well as an identifier to indicate the location of the database to be checked. That is, the client agent may provide the update agent with an identifier of a server having the most recent version of the database.

In one embodiment, the client agent may provide the update agent with a Uniform Resource Locator (URL) corresponding to a server having the most recent version of the database. Multiple URLs or other identifiers may be provided by the client agent. The multiple URLs may correspond to, for example, a remote resource indicating a version number of a most recent database, a primary source for the most recent database, a secondary source for the most recent database or any combination thereof.

The update agent may use the identifiers provided by the mobile device to determine a database version available from the designated remote server, 340. If a newer version of the database is available, 350, the update agent may cause the database on the mobile device to be updated, 360.

Updating of the database may be accomplished by downloading the most recent version of the database from the remote server to the host device and then to the mobile device which replaces the older version of the database with the most recent version of the database. Alternatively, the changes made to the database between versions may be downloaded to the host device and then to the mobile device where the database on the mobile device may be modified to become consistent with the most recent version of the database. In another alternative, the most recent version of the database or updates to the database may be partially downloaded to the host device and then to the mobile device. This may allow bandwidth utilization to be further distributed in time.

When the mobile device includes multiple databases, various ordering techniques may be employed to determine the ordering of updates and/or the timing of the updates. For example, a database update ordering may be performed according to user preferences where a user of the mobile device may provide update preferences for the databases individually and/or an ordering of multiple databases. As another example, database update preferences and/or ordering may be automatically determined based on usage patterns or other types of inferred preferences.

Figure 4:
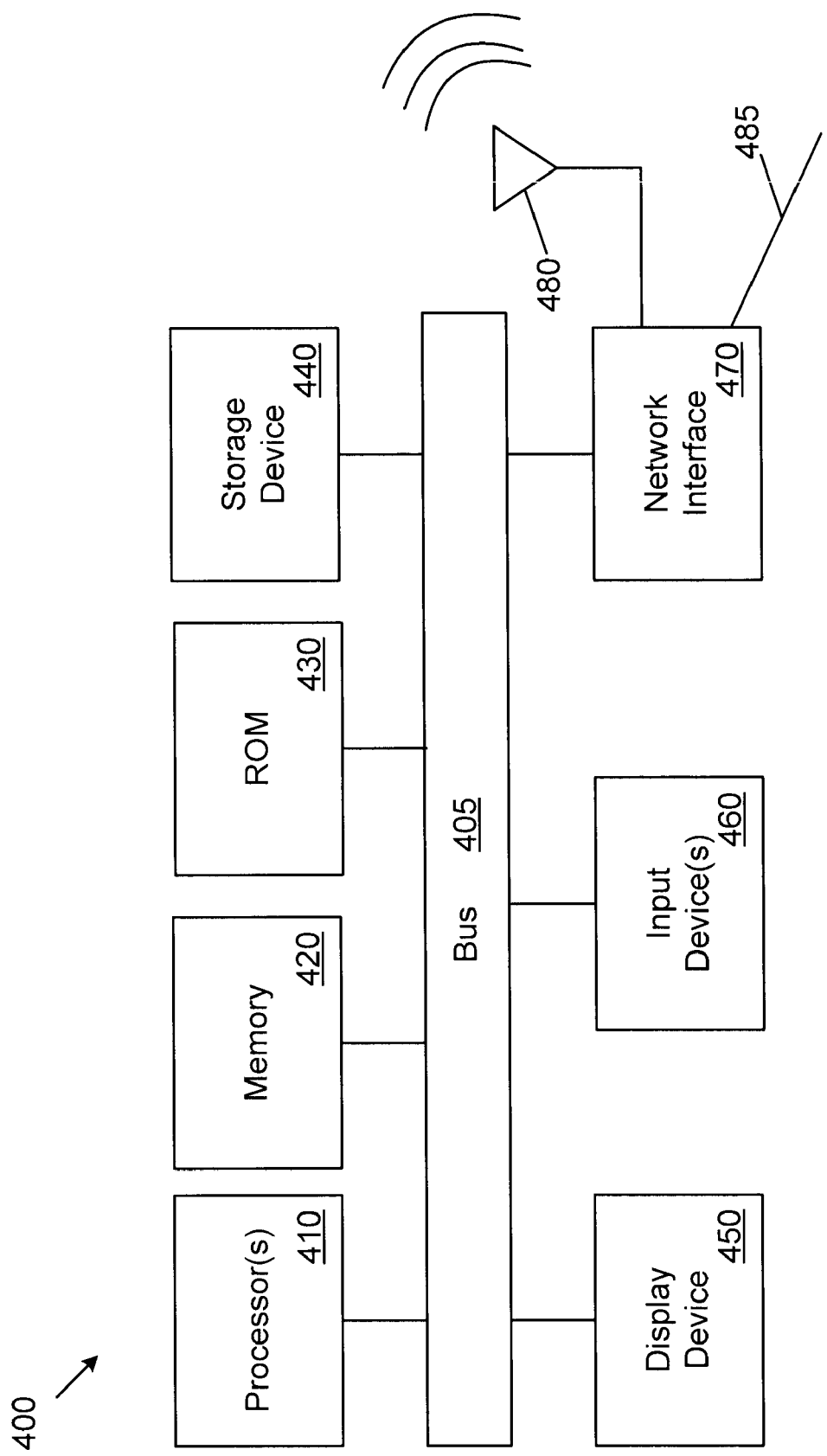
FIG. 4 is a block diagram of one embodiment of an electronic device.

FIG. 4 is a block diagram of one embodiment of an electronic device. The electronic device illustrated in FIG. 4 is intended to represent a range of electronic devices Including, for example, the mobile device and the host device of FIG. 1. Alternative electronic devices can include more, fewer and/or different components. In one embodiment the electronic device of FIG. 4 is a desktop or a laptop computer system that may function as the host device of FIG. 1. In one embodiment, the electronic device of FIG. 4 is a mobile device that may function as the mobile device of FIG. 1. In one embodiment, the mobile device is a smartphone or other cellular-enabled device.

Electronic system 400 includes bus 405 or other communication device to communicate information, and processor 410 coupled to bus 405 to process information. While electronic device 400 is illustrated with a single processor, electronic device 400 can include multiple processors and/or co-processors. Electronic device 400 further includes random access memory (RAM) or other dynamic storage device 420 (referred to as memory), coupled to bus 405 to store information and instructions to be executed by processor 410. Memory 420 also can be used to store temporary variables or other intermediate information during execution of instructions by processor 410.

Electronic device 400 also includes read only memory (ROM) and/or other static storage device 430 coupled to bus 405 to store static information and instructions for processor 410. Data storage device 440 is coupled to bus 405 to store information and instructions. Data storage device 440 such as a magnetic disk or optical disc and corresponding drive can be coupled to electronic device 400.

Electronic device 400 can also be coupled via bus 405 to display device 450, such as liquid crystal display (LCD) or other display device, to display information to a user. Input device(s) 460 may include keys, a mouse, a trackball, or other input devices and may be coupled to bus 405 to communicate information and command selections to processor 410. Electronic device 400 further includes network interface 470 to provide access to a network, such as a local area network. Network interface 470 may include one or more antennae 480 to communicate utilizing wireless protocols and/or cable 485 to communicate utilizing wired protocols.

Instructions are provided to memory from a computer-readable storage device, such as magnetic disk, a read-only memory (ROM) integrated circuit, CD-ROM, DVD, flash memory, via a remote connection (e.g., over a network via network interface 470) that is either wired or wireless, etc. In alternative embodiments, hard-wired circuitry can be used in place of or in combination with software instructions. Thus, execution of sequences of instructions is not limited to any specific combination of hardware circuitry and software instructions.

Figure 5:
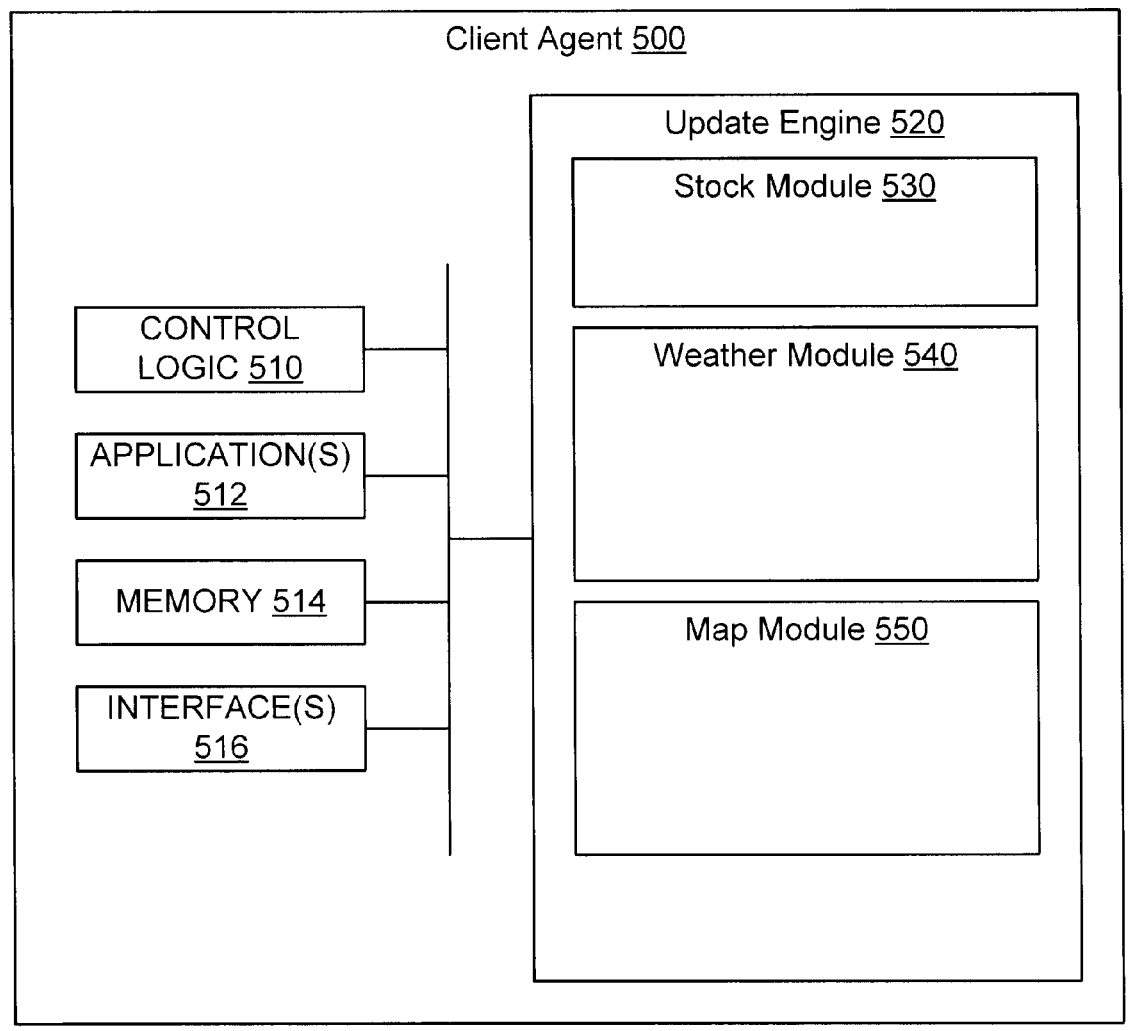
FIG. 5 is a block diagram of one embodiment of a client agent that may be resident on a mobile device.

FIG. 5 is a block diagram of one embodiment of a client agent that may be resident on a mobile device. Client agent 500 includes control logic 510, which implements logical functional control to direct operation of client agent 500, and/or hardware associated with directing operation of client agent 500. Logic may be hardware logic circuits and/or software routines. In one embodiment, client agent 500 includes one or more applications 512, which represent code sequence and/or programs that provide instructions to control logic 510.

Client agent 500 includes memory 514, which represents a memory device and/or access to a memory resource for storing data and/or instructions. Memory 514 may include memory local to client agent 500, as well as, or alternatively, including memory of the host system on which client agent 500 resides. Client agent 500 also includes one or more interfaces 516, which represent access interfaces to/from (an input/output interface) client agent 500 with regard to entities (electronic or human) external to client agent 500.

Client agent 500 also includes update engine 520, which represents one or more functions that enable client agent 500 to provide updates to a database stored on a mobile device. Example modules that may be involved in updating the database include stock module 530, weather module 540 and map module 550. Each of these modules may further include other modules to provide other functions. As used herein, a module refers to routine, a subsystem, etc., whether implemented in hardware, software, or some combination.

Stock module 530 may provide information and/or interaction with financial resources including use of stock ticker symbols and/or names. The stock ticker symbols and/or names may be stored in a database as illustrated in FIG. 1. Weather module 540 may provide information and/or interaction with weather information resources including use of geographical names. The geographical names may be stored in a database as illustrated in FIG. 1.

Map module 550 may provide information and/or interaction with geographical information resources including use of location names. The geographical names may be stored in a database as illustrated in FIG. 1. Additional and/or different modules and databases may be supported by update engine 520 and client agent 500. Any number of modules and databases may be supported by update engine 520 and client agent 400.

Figure 6:
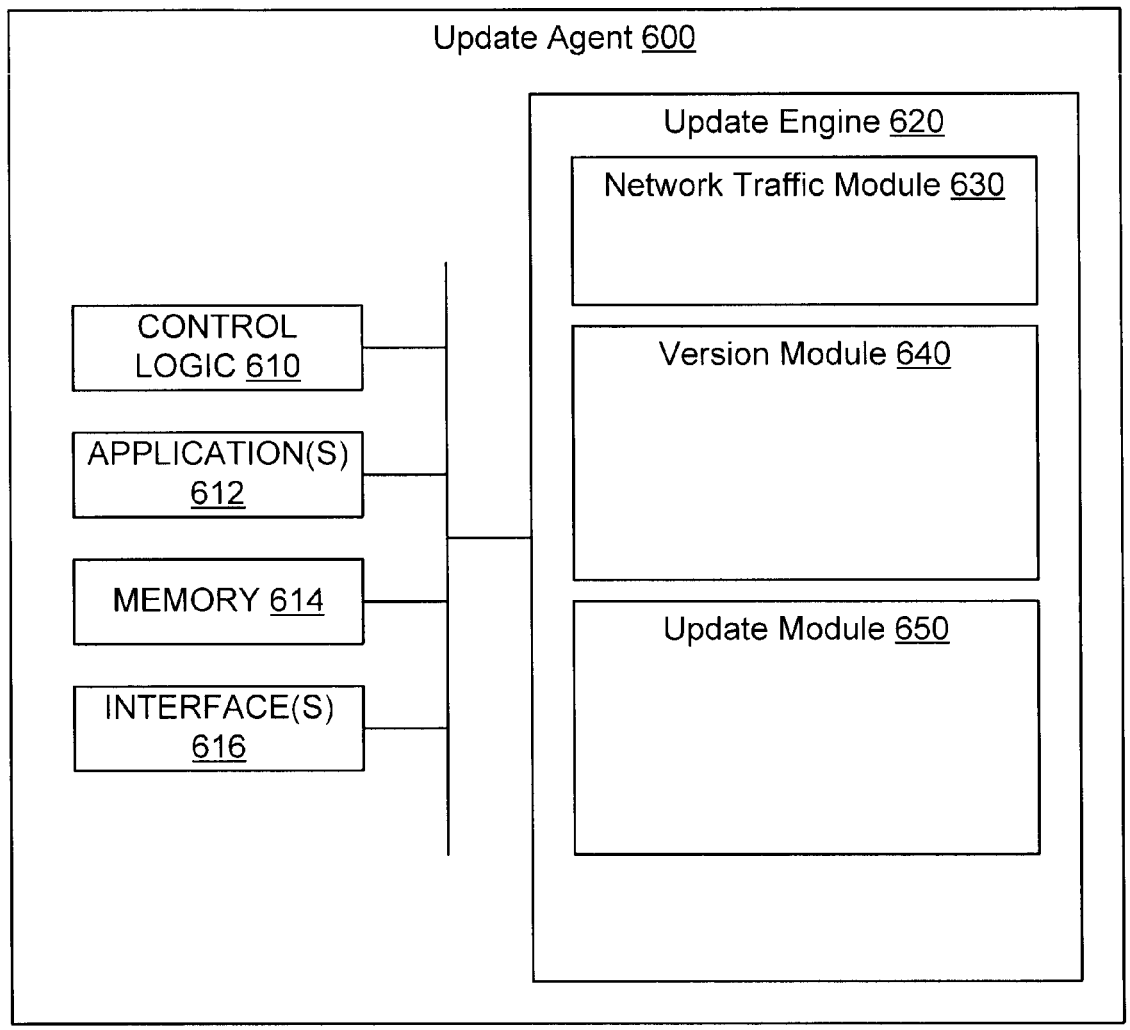
FIG. 6 is a block diagram of one embodiment of an update agent that may be resident on a host device.

FIG. 6 is a block diagram of one embodiment of an update agent that may be resident on a host device. Update agent 600 includes control logic 610, which implements logical functional control to direct operation of update agent 600, and/or hardware associated with directing operation of update agent 600. Logic may be hardware logic circuits and/or software routines. In one embodiment, update agent 600 includes one or more applications 612, which represent code sequence and/or programs that provide instructions to control logic 610.

Update agent 600 includes memory 614, which represents a memory device and/or access to a memory resource for storing data and/or instructions. Memory 614 may include memory local to update agent 600, as well as, or alternatively, including memory of the host system on which update agent 600 resides. Update agent 600 also includes one or more interfaces 616, which represent access interfaces to/from (an input/output interface) update agent 600 with regard to entities (electronic or human) external to update agent 600.

Update agent 600 also includes update engine 620, which represents one or more functions that enable update agent 600 to provide updates to a database stored on a mobile device. Example modules that may be involved in updating the database include network traffic module 630, version module 640 and update module 650. Each of these modules may further include other modules to provide other functions. As used herein, a module refers to routine, a subsystem, etc., whether implemented in hardware, software, or some combination.

Network traffic module 630 may monitor network traffic to and/or from the host device to determine whether a network idle condition exists. As discussed above, under certain conditions, the database may be updated during network idle conditions.

Version module 640 may determine the version of the database stored on the mobile device and/or the most recent version of the database. Version module may further compare the versions to determine whether the database on the mobile device should be updated as described above. Update module 650 may provide the functionality to download (or otherwise acquire) the most recent version of the database or the changes to the database for the host device in order to pass this information to the mobile device. Additional and/or different modules may be supported by update agent 600. Any number of modules may be supported by update agent 600.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   determining whether a primary connection exists to allow communication between a host device and a client device having a database with an associated version;
   periodically determining a version associated with a most recent database available from a remote device;
   determining automatically, in response to detecting a secondary connection between the host device and client device, the version associated with the database on the client device, the secondary connection comprising a lower bandwidth connection with respect to the primary connection;
   comparing the version associated with the database on the client device with the version of the most recent database available from the remote device in response to determining the version associated with the database on the client device; and
   if the version associated with the database on the client device is not the version of the database available from the remote device, updating the database on the client device to include the portion of the most recent database via the host device, wherein updating the database on the client device comprises
      requesting at least a portion of the most recent database available from the remote device via the host device, and
      transferring the at least a portion of the most recent database available from the host device to the client device via the primary connection if the primary connection is idle and there are no requests from applications of the host device and the client device to use the primary connection or the secondary connection otherwise.

2. The method of claim 1 wherein periodically determining the version associated with the most recent database available from the remote device comprises periodically sending a query from the host device to the remote device.

3. The method of claim 1 wherein the primary connection comprises a wireless connection according to a first wireless protocol and the secondary connection comprises a wireless connection according to a second wireless protocol.

4. The method of claim 3 wherein the first wireless protocol conforms to an IEEE 802.11 standard and the second wireless protocol conforms to a Bluetooth standard.

5. The method of claim 1 wherein the primary connection comprises a wireless connection according to a first wireless protocol and the secondary connection comprises a wired connection according to a second protocol.

6. The method of claim 1 wherein the database includes a listing of names corresponding to geographical locations.

7. The method of claim 1 wherein the database includes a listing of names corresponding to stock symbols.

8. An article comprising a tangible computer-readable storage medium having stored thereon instructions that, when executed, cause one or more processors to:
   determine whether a primary connection exists to allow communication between a host device and a client device having a database with an associated version;
   periodically determine a version associated with a most recent database available from a remote device;
   determine automatically, in response to detecting a secondary connection between the host device and client device, the version associated with the database on the client device, the secondary connection comprising a lower bandwidth connection with respect to the primary connection;
   compare the version associated with the database on the client device with the version of the most recent database available from the remote device in response to determining the version associated with the database on the client device; and
   if the version associated with the database on the client device is not the version of the database available from the remote device, update the database on the client device to include the portion of the most recent database via the host device, wherein updating the database on the client device comprises
      requesting at least a portion of the most recent database available from the remote device via the host device, and
      transferring the at least a portion of the most recent database available from the host device to the client device via the primary connection if the primary connection is idle and there are no requests from applications of the host device and the client device to use the primary connection or the secondary connection otherwise.

9. The article of claim 8 wherein the instructions that cause the one or more processors to periodically determine the version associated with the most recent database available from the remote device comprise instructions that, when executed, cause the one or more processors to periodically send a query from the host device to the remote device.

10. The article of claim 8 wherein the primary connection comprises a wireless connection according to a first wireless protocol and the secondary connection comprises a wireless connection according to a second wireless protocol.

11. The article of claim 10 wherein the first wireless protocol conforms to an IEEE 802.11 standard and the second wireless protocol conforms to a Bluetooth standard.

12. The article of claim 8 wherein the primary connection comprises a wireless connection according to a first wireless protocol and the secondary connection comprises a wired connection according to a second protocol.

13. The article of claim 8 wherein the database includes a listing of names corresponding to geographical locations.

14. The article of claim 8 wherein the database includes a listing of names corresponding to stock symbols.

15. An apparatus comprising:
   means for determining whether a primary connection exists to allow communication between a host device and a client device having a database with an associated version;
   means for periodically determining a version associated with a most recent database available from a remote device;
   means for determining automatically, in response to detecting a secondary connection between the host device and client device, the version associated with the database on the client device, the secondary connection comprising a lower bandwidth connection with respect to the primary connection;
   means for comparing the version associated with the database on the client device with the version of the most recent database available from the remote device in response to determining the version associated with the database on the client device; and
   means for, if the version associated with the database on the client device is not the version of the database available from the remote device, updating the database on the client device to include the portion of the most recent database via the host device, wherein updating the database on the client device comprises
      requesting at least a portion of the most recent database available from the remote device via the host device, and
      transferring the at least a portion of the most recent database available from the host device to the client device via the primary connection if the primary connection is idle and there are no requests from applications of the host device and the client device to use the primary connection or the secondary connection otherwise.

* * * * *